Patented Nov. 12, 1940

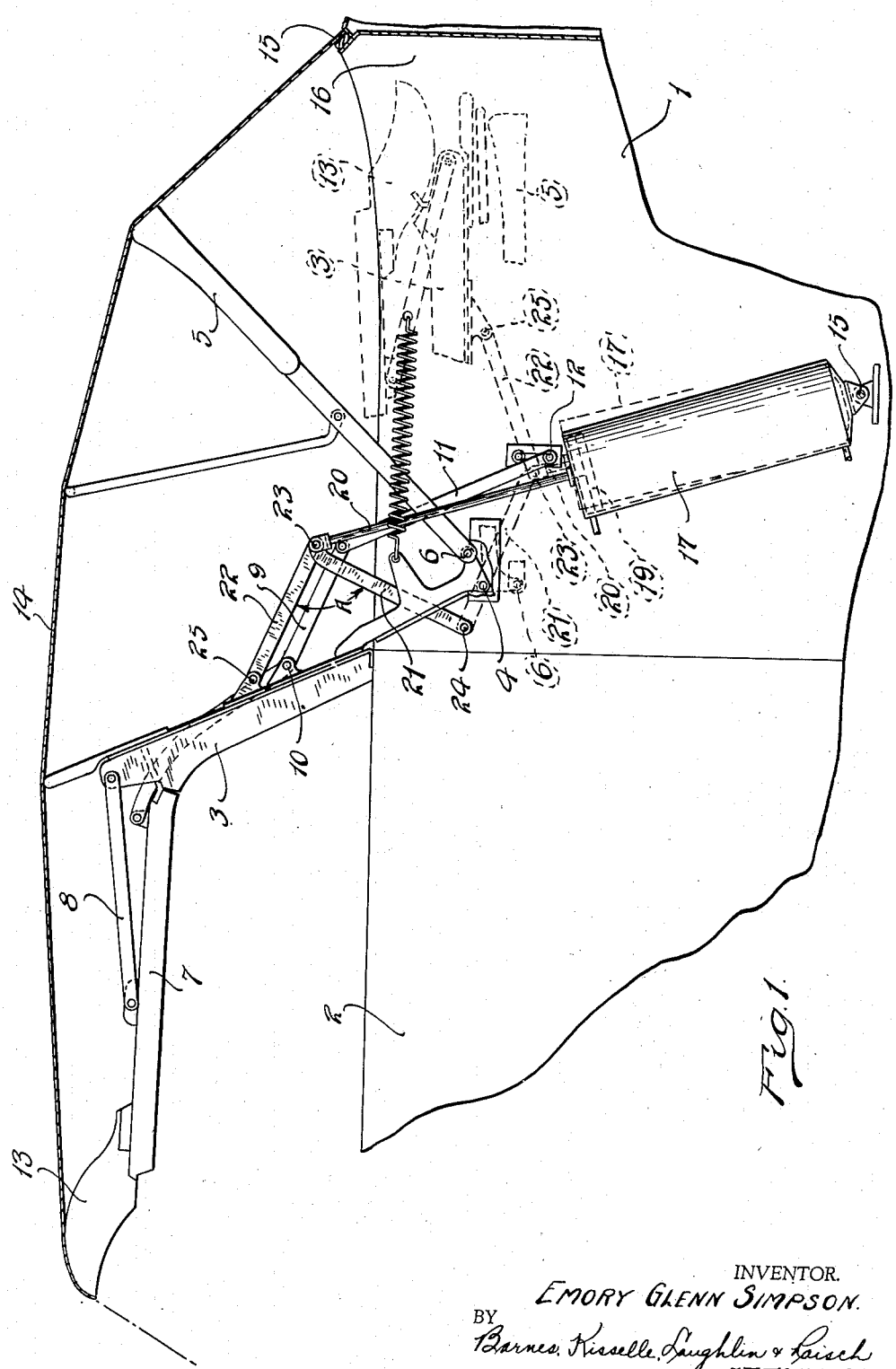

2,221,460

UNITED STATES PATENT OFFICE 2,221,460

POWER OPERATED COLLAPSIBLE VEHICLE TOP

Emory Glenn Simpson, Detroit, Mich., assignor to General Motors Corporation, Detroit, Mich., a corporation of Delaware Application March 23, 1940, Serial No. 325,531

3 Claims. (Cl. 296—117)

This invention relates to a power operated collapsible vehicle top for an automobile body.

It is an object of this invention to produce a power operated collapsible vehicle top which will raise and lower with uniform speed.

Since the overall length or size of the power unit, which is usually a vacuum motor run off of the intake manifold vacuum, is limited by the space available in the rear compartment of the body, it is an object of this invention to utilize the power developed by such a power unit to the maximum mechanical advantage in the raising and lowering of the top.

The figure is a vertical longitudinal section through a convertible coupe showing the collapsible top and power unit.

Referring more particularly to the drawing there is shown a vehicle body 1 of the convertible coupe type having a door 2 hinged at its forward edge (not shown). The top comprises a main bow 3 of U shape which extends completely across the body and is pivoted at each end to the body as at 4. An auxiliary bow 5 is pivoted to the main bow as at 6 and cant rails 7 are supported on the main bow by links 8 and levers 9 to the main bow as at 10. Lever 9 is connected to a control link 11 pivoted to the body as at 12. Cant rails 7 support the windshield header 13. Top fabric 14 is secured to the bows and header and to the body as at 15. As the top is lowered the control link 11 and lever 9 control the collapsing of the top so that it will fold into the rear compartment 16, as shown in the dotted lines.

The raising and lowering of the top is accomplished by a pair of air motors each in the form of a cylinder 17 pivoted to the floor of the rear compartment 16 as at 18. The air cylinder 17 is connected with the intake manifold vacuum in a conventional manner (not shown). A piston 19 within the air cylinder 17 is provided with a connecting rod 20 which is pivotally connected to a lever 21 and thrust link 22 as at 23. The lower end of the lever 21 has a fixed pivotal connection 24 on the body. Thrust link 22 is pivotally connected to the bow 3 as at 25. As shown in the full lines the top is raised.

It should be noted that fixed pivot 24 is positioned to the left of fixed pivot 4. As the piston rod 20 travels downwardly in the lowering of the top, bow 3 swings clockwise about pivot 4 and lever 21 swings clockwise about pivot 24 and the distance between pivots 25 and 24 increases. When the top is raised the angle A between the levers 21 and thrust links 22 is approximately 90° whereas when the top is lowered this angle is increased to approximately 120°. Thus the lever 21 and link 22 tend to flatten out as the top is lowered.

It should be noted that when the top is raised the perpendicular distance between pivot point 23 and the bow 3 is greater than the perpendicular distance between the pivot point 23 and the bow 3 when the top is lowered. By having the pivot point 23 spaced a greater perpendicular distance from the bow 3 than when lowered, better mechanical advantage is taken of the power developed by the motor 17. Since the length of the cylinder 17 and the length of the piston stroke are constant, it is essential that the perpendicular distance between the pivot 23 and bow 3 should vary, that is, be less when the top is down than when the top is up. If the angle A did not become less as the top is lowered, obviously the top could not be completely lowered into the compartment 16 because pivot connection 23 would strike the top of the cylinder 17 before the top is completely collapsed. Thus by providing a collapsible connection in the form of lever 21 and thrust link 22 between the connecting rod and the bow 3, the power is applied to the top with the best mechanical advantage and uniformly smooth raising and lowering action is accomplished.

It is, of course, understood that the raising and lowering of the top can be accomplished by any suitable power means other than the air motors above described if it is so desired.

I claim:

1. In a collapsible top for an automotive vehicle body the combination of a pivoted main bow, power means including a cylinder pivoted to the vehicle body upon a fixed pivot, a reciprocating piston in the cylinder and a connecting rod fixed to the piston, a connection between the piston rod and the pivoted main bow in the form of a lever and thrust link, a fixed pivot for one end of the said lever offset from the pivot of the main bow, the said link pivotally connected at one end to the bow and at the other end to the said lever, a pivotal connection between the connecting rod and the said link and lever whereby as the connecting rod is retracted into the piston to lower the top the angle between the link and lever increases to permit full lowering of the top into the body compartment thereof.

2. In a collapsible vehicle top for a vehicle body the combination comprising a main bow having a fixed pivotal connection with the body, power means for raising and lowering the top including a reciprocating connecting rod, a thrust link and lever pivotally connected to each other and to the bow and vehicle body respectively, the pivotal connection between the lever and the body being positioned forwardly of the pivotal connection between the bow and the body, a pivotal connection between the connecting rod and the said lever whereby in the lowering of the top power is applied from the connecting rod through the link to the pivoted bow and the pivotal connection between the link and lever moves towards the bow as the top is lowered.

3. In a collapsible top for an automotive vehicle body the combination comprising a main bow pivoted at its lower ends to the body, power means including a cylinder pivoted at its lower end to the body about a fixed pivot, a reciprocating piston in said cylinder and a connecting rod fixed to the piston, a link and lever pivotally connected to each other and to the bow and body respectively, the pivotal connection between the lever and body being positioned forwardly of the pivotal connection between the bow and body whereby in the lowering of the body the pull of the connecting rod is transmitted by the link to the said bow and the direction of the pull and swinging of the connecting rod and cylinder is controlled by the said lever.

EMORY GLENN SIMPSON.